US010776848B2

(12) United States Patent
Shiely et al.

(10) Patent No.: US 10,776,848 B2
(45) Date of Patent: Sep. 15, 2020

(54) SYSTEM, METHOD, AND MANUFACTURE FOR A LARGE PRODUCT PRESOURCING SEARCH ENGINE

(71) Applicant: BBY SOLUTIONS, INC., Richfield, MN (US)

(72) Inventors: Brent Shiely, Eden Prairie, MN (US); Rambabu Raipati, Lakeville, MN (US); Rick E. Allan, Prior Lake, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 396 days.

(21) Appl. No.: 15/459,708

(22) Filed: Mar. 15, 2017

(65) Prior Publication Data

US 2018/0268455 A1   Sep. 20, 2018

(51) Int. Cl.
*G06Q 30/00* (2012.01)
*G06Q 30/06* (2012.01)
*G06Q 10/08* (2012.01)
*G06F 16/951* (2019.01)
*G06F 16/9537* (2019.01)

(52) U.S. Cl.
CPC ....... *G06Q 30/0625* (2013.01); *G06F 16/951* (2019.01); *G06F 16/9537* (2019.01); *G06Q 10/083* (2013.01); *G06Q 10/087* (2013.01); *G06Q 30/06* (2013.01); *G06Q 30/0601* (2013.01); *G06Q 30/0603* (2013.01); *G06Q 30/0633* (2013.01); *G06Q 30/0639* (2013.01); *G06Q 30/0641* (2013.01); *G06Q 30/0643* (2013.01)

(58) Field of Classification Search
CPC ................. G06Q 30/0601–0645; G06Q 30/08
USPC ................................................ 705/26.1–27.2
See application file for complete search history.

(56) References Cited

U.S. PATENT DOCUMENTS 7,295,990 B1   11/2007   Braumoeller et al.
7,437,305 B1   10/2008   Kantarjiev et al.
7,747,543 B1    6/2010   Braumoeller et al.
(Continued)

OTHER PUBLICATIONS

Sterling, Greg, Google Connects Online And Offline With Local Product Availability, Nov. 15, 2010, SearchEngineLand, accessed at [https://searchengineland.com/google-connects-online-and-offline-with-local-product-availability-55863] (Year: 2010).*

(Continued)

*Primary Examiner* — Jeffrey A. Smith
*Assistant Examiner* — Lindsey B Smith
(74) *Attorney, Agent, or Firm* — Schwegman Lundberg & Woessner, P.A.

(57) ABSTRACT

Systems and techniques for large product pre-sourcing search engine are described herein. A location may be determined for a user of an application. A search query may be received via the application. Search results may be returned based on the search query which may include a product with special handling constraints. A local availability may be determined for the product with special handling constraints using the location of the user. A delivery availability may be determined for the product with special handling constraints using the location of the user. The search results may be output to a user interface of the application including the local availability and the delivery availability.

21 Claims, 10 Drawing Sheets

(56) References Cited

U.S. PATENT DOCUMENTS

| | | |
|---|---|---|
| 8,249,917 B1 | 8/2012 | Kassmann |
| 8,374,922 B1 | 2/2013 | Antony |
| 8,527,373 B1* | 9/2013 | Ricci .................. G06Q 10/087 705/22 |
| 8,615,473 B2 | 12/2013 | Spiegel |
| 9,152,987 B1 | 10/2015 | Petrich et al. |
| 10,387,824 B2 | 8/2019 | Gillen et al. |
| 2001/0049619 A1 | 12/2001 | Powell et al. |
| 2002/0107716 A1 | 8/2002 | Callahan et al. |
| 2002/0157089 A1 | 10/2002 | Patel et al. |
| 2003/0171996 A1* | 9/2003 | Chen .................. G06Q 10/08 705/26.81 |
| 2004/0064351 A1 | 4/2004 | Mikurak |
| 2005/0043037 A1 | 2/2005 | Ioppe et al. |
| 2008/0294491 A1 | 11/2008 | Hersh et al. |
| 2011/0054978 A1 | 3/2011 | Mohil |
| 2012/0265632 A1 | 10/2012 | Patro |
| 2013/0013454 A1 | 1/2013 | Sears |
| 2013/0054805 A1 | 2/2013 | Lipari et al. |
| 2014/0095350 A1 | 4/2014 | Carr et al. |
| 2014/0279277 A1 | 9/2014 | Pei |
| 2015/0046363 A1 | 2/2015 | Mcnamara et al. |
| 2015/0100447 A1* | 4/2015 | Bohbot .................. G06Q 30/08 |
| 2015/0294262 A1 | 10/2015 | Nelson et al. |
| 2015/0363843 A1 | 12/2015 | Loppatto et al. |
| 2016/0103559 A1 | 4/2016 | Maheshwari et al. |
| 2016/0180288 A1 | 6/2016 | Sager et al. |
| 2016/0267228 A1 | 9/2016 | Van Wyck et al. |
| 2016/0270137 A1 | 9/2016 | Yong et al. |
| 2016/0335686 A1 | 11/2016 | Athulurutlrumala et al. |
| 2016/0379213 A1 | 12/2016 | Isaacson et al. |
| 2017/0024804 A1* | 1/2017 | Tepfenhart, Jr. ... G06Q 30/0635 |
| 2017/0031887 A1 | 2/2017 | Franczyk et al. |
| 2017/0083911 A1 | 3/2017 | Phillips |
| 2017/0206589 A1 | 7/2017 | Deshpande et al. |
| 2017/0278062 A1* | 9/2017 | Mueller .................. G01S 19/13 |
| 2018/0268349 A1 | 9/2018 | Martinson et al. |
| 2019/0197798 A1 | 6/2019 | Abari et al. |

OTHER PUBLICATIONS

"Is Ship-from-Shore Distribution Right for Your?", © Fortna. (2015), 1-7.

"Ship-from-Shore Distribution: Reducing the Impact of an Imperfect Forecast", © Fortna, (2015), 1-7.

"U.S. Appl. No. 15/459,764, Non Final Office Action dated Apr. 25, 2019", 25 pgs.

"U.S. Appl. No. 15/459,764, Advisory Action dated Feb. 4, 2020", 5 pgs.

"U.S. Appl. No. 15/459,764, Final Office Action dated Oct. 24, 2019", 29 pgs.

"U.S. Appl. No. 15/459,764, Non Final Office Action dated Mar. 30, 2020", 35 pgs.

"U.S. Appl. No. 15/459,764, Response filed Jan. 14, 2020 to Final Office Action dated Oct. 24, 2019", 15 pgs.

"U.S. Appl. No. 15/459,764, Response filed Jul. 23, 2019 to Non-Final Office Action dated Apr. 25, 2019", 14 pgs.

* cited by examiner

Shop Category

Dryers (30)
Washing Machines (30)
Washer Dryer Combos (2)

Color — *305A*
☐ White (1)
☐ Black (1)
☐ Red (1)

Features — *305B*
☐ Stackable
☐ High-Efficiency
Show more

Price — *305C*
☐ to ☐
☐ $0 - $249.99 (1)
☐ $250 - $499.99 (1)
☐ $500 - $749.99 (1)

Delivery Date — *305D*
☐ Tomorrow (1)
☐ 2-3 Business Days (2)
☐ 4-6 Business Days (3)

Install Date — *305E*
☐ Tomorrow (0)
☐ 2-3 Business Days (1)
☐ 4-6 Business Days (3)

Search Results for: ACME Brand Washers

| All Items (3) | Pick Up Today (1) |

Sort By: Delivery Date ▽    My Store: EAGAN, MN    Zip Code 55123 (Change) — *310*

ACME – 4.5 Cu. Ft. 14 Cycle Front Loading Washer – Red
Delivery: FREE — *315A*    Delivery with installation — *330A*    $549.99
As soon as 1/31/2016    available as soon as 2/2/2016
Store Pickup: EAGAN MN                                            [ ADD TO CART ]
Pick up Today — *320A*                                            *325A*

ACME – 4.5 Cu. Ft. 12 Cycle Front Loading Washer – Black
Delivery: FREE — *315B*    Delivery with installation — *330B*    $499.99
As soon as 2/1/2016    available as soon as 2/6/2016
Store Pickup: EAGAN MN                                            [ ADD TO CART ]
Pick up by 2/2/2016 — *320B*                                     *325B*

ACME – 3.5 Cu. Ft. 14 Cycle Front Loading Washer – White
Delivery: FREE — *315C*    Delivery with installation — *330C*    $249.99
As soon as 2/6/2016    available as soon as 2/6/2016
Store Pickup: EAGAN MN                                            [ ADD TO CART ]
Pick up by 2/6/2016 — *320C*                                     *325C*

*FIG. 3*

Shop Category

Dryers (30)
Washing Machines (30)
Washer Dryer Combos (2)

Color — 405A
- ☐ White (1)
- ☐ Black (1)
- ☐ Red (1)

Features — 405B
- ☐ Stackable
- ☐ High-Efficiency

Show more

Price — 405C
[ ] to [ ⌵ ]
- ☐ $0 - $249.99 (1)
- ☐ $250 - $499.99 (1)
- ☐ $500 - $749.99 (1)

Delivery Date — 405D
- ☐ Tomorrow (1)
- ☐ 2-3 Business Days (2)
- ☐ 4-6 Business Days (3)

Install Date — 405E
- ☐ Tomorrow (0)
- ☐ 2-3 Business Days (1)
- ☐ 4-6 Business Days (3)

Search Results for: ACME Brand Washers

| All Items (3) | Pick Up Today (1) |

Sort By: [Delivery Date ⌵]   My Store: EAGAN, MN   Zip Code 55123 (Change) — 410

ACME – 4.5 Cu. Ft. 14 Cycle Front Loading Washer – Red
🚚 Delivery: FREE — 415A   Delivery with installation — 430   $549.99
   As soon as 1/31/2016   available as soon as 2/2/2016
🏪 Store Pickup: EAGAN MN — 420A   [ADD TO CART] — 425A
   Unavailable ACME – 4.5 Cu. Ft. 12 Cycle Front Loading Washer – Black
🚚 Delivery: FREE — 415B   $499.99
   Unavailable
🏪 Store Pickup: EAGAN MN — 420B   [ADD TO CART] — 425B
   Pick up by 2/2/2016

ACME – 3.5 Cu. Ft. 14 Cycle Front Loading Washer – White
🚚 Delivery: FREE — 415C   $249.99
   Unavailable   UNAVAILABLE — 435
🏪 Store Pickup: EAGAN MN — 420C
   Unavailable

*FIG. 4*

SYSTEM, METHOD, AND MANUFACTURE FOR A LARGE PRODUCT PRESOURCING SEARCH ENGINE

RELATED APPLICATIONS

The present application includes subject matter related to U.S. patent application Ser. No. 15/459,764, titled "CACHED DATA REPRESENTATIONS FOR SERVICE SCHEDULE AVAILABILITY", and filed Mar. 15, 2017, the contents of which are incorporated by reference herein.

TECHNICAL FIELD

Embodiments discussed herein generally relate to user interface functionality and search engine techniques used in electronic computing and communication systems. Certain embodiments discussed herein relate to techniques that select and display large products in a web-browser using geolocation and internal transit routes and schedules.

BACKGROUND

A number of electronic systems are commonly used to coordinate the offer and sale of products or services in electronic commerce settings. For example, although a consumer user may access a website or mobile app user interface when attempting to make an electronic commerce purchase, the website or mobile app will often contact a large number of data systems to request and obtain information for product availability, location, cost, shipping information, and the like. Thus, even if a consumer views, selects, and purchases a single product, a large number of electronic processing and data storage systems may be involved to generate the user interface and ultimately fulfill the purchase and to schedule or perform an accompanying service.

The purchase of a specialized product, such as large, heavy, or fragile products that cannot be shipped by common carriers in small boxes, adds additional complexity to the electronic commerce process. There may be various constraints on shipping, handling, and delivery procedures, which are further complicated by fulfillment rules from distributors or retailers. For example, specialized products such as household appliances often require setup and installation services at the time of delivery, leading to additional complexity and coordination from multiple parties. Existing approaches for providing coordinating fulfillment of delivery and installation of specialized products often involves manual human involvement, which leads to incomplete or vague information about service availability and delivery times. Such existing processes may lead to unexpected and unreliable outcomes, and a lack of information for consumers with existing types of user interfaces.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a website interface for large product pre-sourcing search engine, according to an embodiment.

FIG. 4 illustrates an example of a website interface for large product pre-sourcing search engine, according to an embodiment.

DETAILED DESCRIPTION

Figure 1:
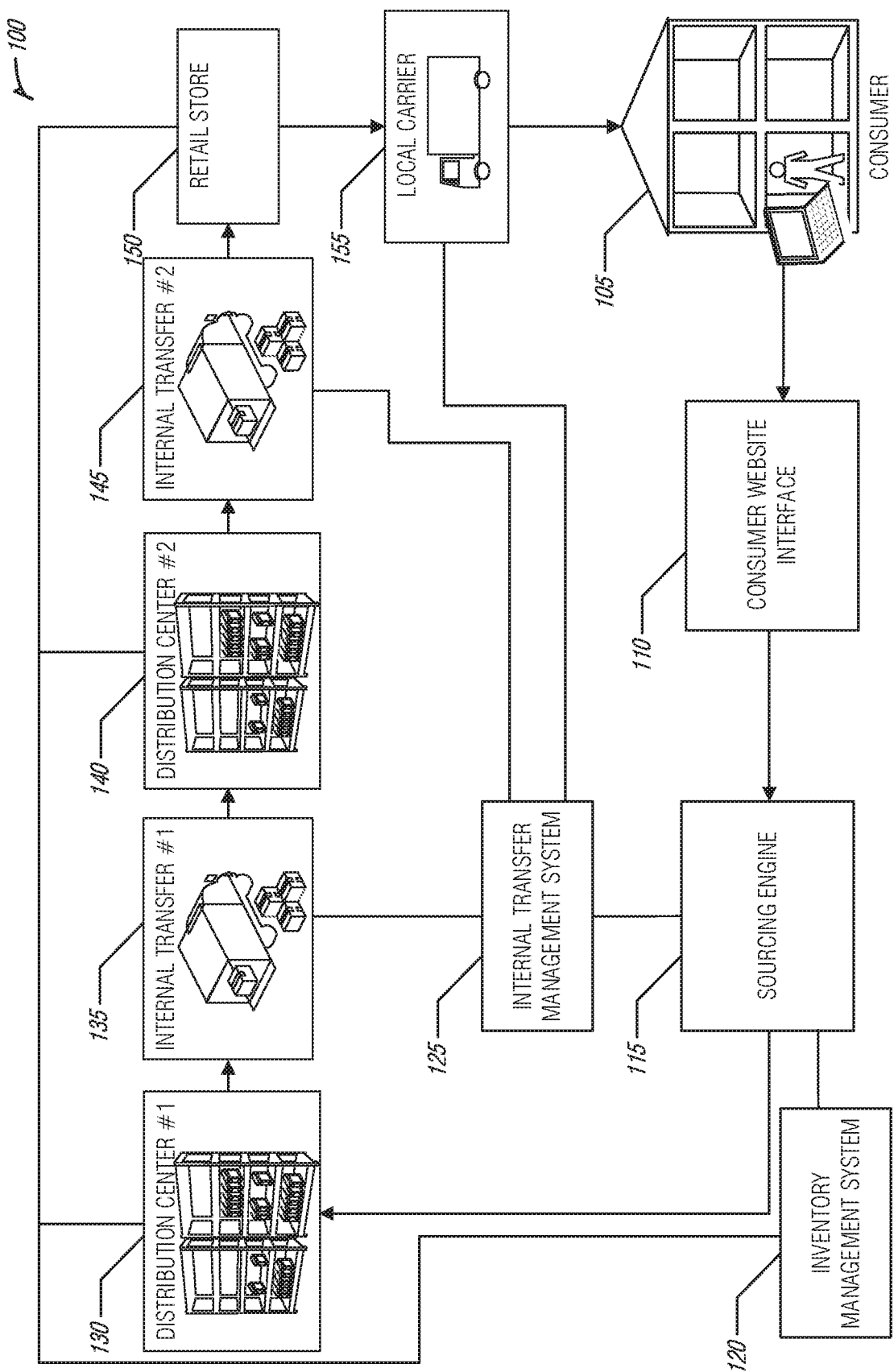
FIG. 1 is a block diagram of an example of an environment and system for a large product pre-sourcing search engine, according to an embodiment.

An entity (e.g., online retailer, etc.) may offer products for sale over the internet via web-based shopping sites. The products offered for sale may vary in shape and size. For example, product offerings may include a computer mouse, television, refrigerator, etc. Some products may have shipping constraints due to weight and/or size. For example, some parcel companies may limit transit services based on size and/or weight. In another example, it may not be cost effective to ship individual large and/or heavy items long distances. The constraints due to products size may cause a customer to add a product to an electronic shopping cart only to find out later in the process that the item cannot be shipped, that the shipping costs may be very high, and/or it may take a long time for the product to arrive resulting in customer frustration. In some cases, the frustration may cause the customer to visit a competitor's website.

The present techniques provide a large product pre-sourcing search engine for locating large products matching a customer query and providing the customer with a display of the matching products along with availability and transit time (e.g., delivery) information. The results may be selected based on a location of the customer (e.g., a detected zip code for the customer, customer provided zip code, other geolocation information, etc.) and the retailer's internal transit routes and schedules. For example, the customer may search for a refrigerator and the refrigerator 1 may be selected as a search result because it is available same day in a store local to the customer's zip code, and refrigerator 2 may be selected because it is available for delivery in two days using the retailer's internal distribution center-to-store and store-to-store transit routes and schedules. For example, refrigerator 2 may be able to be loaded onto a pre-scheduled truck traveling between a store located 100 miles from the customer's zip code and a distribution center that is responsible for delivering products to a metropolitan area including the customer's zip code for delivery to the customer on the second day.

Because products with shipping constraints may use specialized transportation, knowing the availability of the product and delivery date may be beneficial for both customers and electronic systems. For example, a customer may make arrangements for additional help moving a refrigerator after delivery. Multiple customers may be shopping for the same item when visiting an electronic commerce website of a retailer. For example, customer A and customer B may both be shopping for an ACME washing machine. If there is a single ACME washing machine available and both purchase the washing machine, either customer A or customer B will be disappointed as the order may be cancelled and not washing machine will arrive. Similarly, there may be enough inventory to fulfill both orders, however, if customer A and customer B are in the same location (e.g., same zip code) and both order the ACME washing machine for delivery and there is only one delivery slot available in to the location in the following week either customer A or customer B may have to wait additional time for the washing machine to arrive. These issues present a resource management problem of limited inventory and delivery capacity.

The resource management problem may be addressed by reserving inventory and delivery capacity while a customer finalizes an order. For example, customer A may have been presented with search results including a variety of washing machines in response to submitting a query for washing machines. The search results may include a local pickup availability date, a delivery date, and a delivery with installation date. When the customer selects an ACME washing machine from the search result (e.g., by clicking an Add to Cart button, etc.) the inventory quantity of the ACME washing machine may be decremented. If the customer selected the ACME washing machine for delivery, the delivery capacity for the customer's location may be decremented. If the customer selected delivery with installation, the installation capacity may be decremented. If the customer removes the ACME washer from the electronic shopping cart any decremented inventory, delivery capacity, and/or installation capacity may be incremented. Thus, while the customer has the item in the electronic shopping cart the product and delivery may be reserved, preventing conflict with another customer shopping on the website.

FIG. 1 is a block diagram of an example of an environment 100 for a large product pre-sourcing search engine, according to an embodiment. The environment 100 may include a consumer 105 that may be using an electronic commerce site of a retailer to purchase an item using the Internet via a consumer website interface 110. The consumer website interface 110 may be communicatively coupled (e.g., via the internet, wired network, wireless network, shared bus, etc.) to a sourcing engine 115. The sourcing engine 115 may be communicatively coupled to an inventory management system 120 and an internal transfer management system 125. The sourcing engine 115 and/or the inventory management system 120 may track product inventory in the distribution center #1 130, distribution center #2 140, and the retail store 150. The internal transfer management system 125 may generate transit maps and schedules for transferring items between inventory locations. For example, the internal transfer management system 125 may determine that a product may be transferred between distribution center #1 130 and distribution center #2 140 using internal transfer #1 135, between distribution center #2 140 and retail store 150 using internal transfer #2 145, and between the retail store 150 and the consumer 105 using local carrier 155.

The consumer 105 may use a web browser to load the consumer website interface 110. The consumer website interface 110 may include a search engine that the consumer 105 may use to submit a query for a product (e.g., using product name, type, keyword, etc.) the search engine may located items offered for sale by the retailer that match the query submitted by the consumer 105. The consumer website interface 110 may include a feature that determines (e.g., using internet protocol address, user profile information, etc.) the location (e.g., zip code, etc.) of the consumer 105. The consumer 105 may be searching for a large product (e.g., clothes washer, clothes dryer, refrigerator, etc.) that may have transportation constraints and the location of the consumer 105 may be used by the search engine when selecting search results. As an example, a large product may be a product that has special handling constraints, such as constraints based on size, weight, fragility (e.g., fragile contents), or requires accompanying services (e.g., installation, removal, specialized delivery handling, and the like).

The search engine may work in conjunction with the sourcing engine 115 to determine item availability and delivery availability for large items. For example, the sourcing engine 115 may use a zip code for the consumer 105 and the inventory management system 120 to locate washing machines that are available for local pickup at a store location near the location of the consumer 105. Additionally or alternatively, the sourcing engine 115 may work in conjunction with the inventory management system 120 and the internal transfer management system 125 to locate washing machines that may be delivered to the location of the consumer 105. For example, the sourcing engine 115 may determine that distribution center #1 130 has a washing machine that may be transferred through distribution center #2 140 to retail store 150 for ultimate delivery to the consumer 105.

The internal transfer management system 125 may generate a transit map for the transfer using a pre-existing internal transfer network of the retailer to determine that the product should be transferred using internal transfer #1 135, internal transfer #2 145, and local carrier 155. The internal transfer management system 125 may calculate a delivery date for the item using a transfer schedule and cutoff times for the internal transfers. For example, the consumer may be searching for a product at 6 PM on Tuesday and the cutoff time for internal transfer #1 135 between distribution center #1 130 and distribution center #2 140 for Tuesday night may be 9 PM Tuesday. The internal transfer management system 125 may calculate that the item may be transferred Tuesday night using internal transfer #1 135 until 9 PM on Tuesday. The internal transfer management system 125 may calculate that the item may be at distribution center #2 140 for internal transfer #2 145 between distribution center #2 140 and retail store 150 scheduled for Wednesday night and will be in the retail store 150 Thursday morning for a delivery slot via local carrier 155. Thus, the internal transfer management system 125 may calculate that the item may be available for delivery in two days.

The search engine may display the calculated local availability date and the calculated delivery availability date in the search results along with the item. For example, a washing machine in the search results may be displayed with a local pickup date of the same day and delivery date two days after the current date. Providing the consumer 105 with these dates in the search results improves the website interface by reducing the number of screens that the consumer 105 interacts with to determine product availability. In some examples, if a product is unavailable locally and for delivery, the search results may be modified to replace a button for adding the item to an electronic cart with a message indicating the product is unavailable. In some examples, the search results may be sorted and/or filtered to place products with shorter availability dates higher in the search list and/or suppress unavailable products from the search results.

In a further example, additional logic features may be used to identify a particular source of a product based on the product's characteristics and location. For instance, logic may be used to determine a particular source of a product based on a sourcing rule set (such as sourcing a particular product from a warehouse first, from a store second, and finally from third party that could fulfill it). Also for instance, logic may be used to determine a particular source of a used or open-box product based on a sourcing rule set (such as sourcing a particular product from a refurbishment center first, from a store second, and finally from a warehouse last). Also for instance, logic may be used to determine a particular source of a product based on considerations to optimize transfer routes, reduce the number of hops for a particular product, or optimize profit or reduce shipping costs for a particular product transaction. Other forms of logic and rules may be used for similar business or technical considerations.

Figure 2:
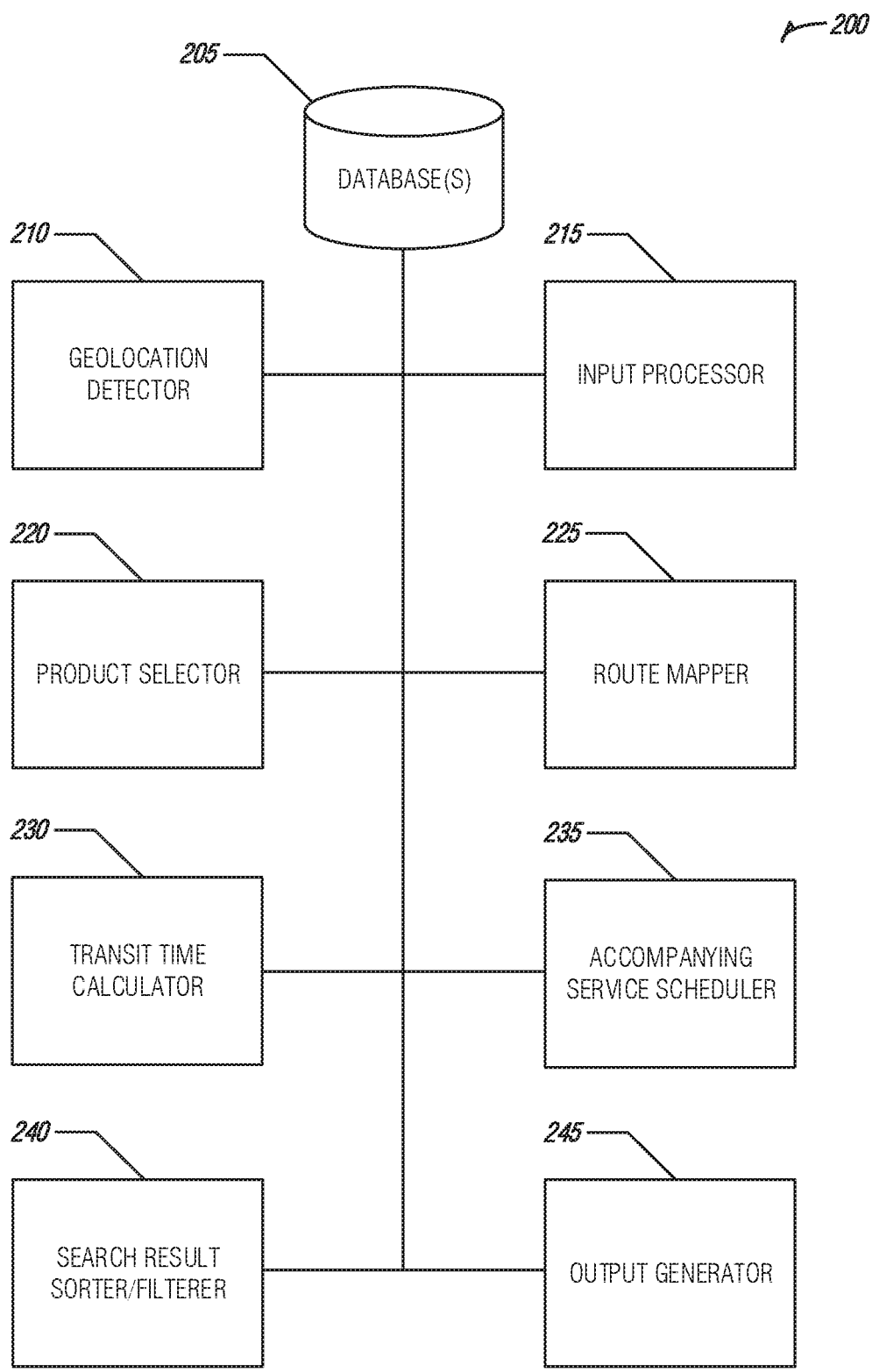
FIG. 2 illustrates a block diagram of an example of a system for large product pre-sourcing search engine, according to an embodiment.

FIG. 2 illustrates a block diagram of an example of a system 200 for a large product pre-sourcing search engine, according to an embodiment. The system 200 may include a variety of components including database(s) 205, geolocation detector 210, input processor 215, product selector 220, route mapper 225, transit time calculator 230, accompanying service scheduler 235, search result sorter/filterer 240, and output generator 245.

The present subject matter may be implemented in various configurations. For example, the database(s) 205, the geolocation detector 210, the input processor 215, the product selector 220, the route mapper 225, the transit time calculator 230, the accompanying service scheduler 235, the search result sorter/filterer 240, and the output generator 245 may be implemented in different (or the same) computing systems (e.g., a single server, a collection of servers, a cloud-based computing platform, etc.). A computing system may comprise one or more processors (e.g., hardware processor 1002 described in FIG. 10, etc.) that execute software instructions, such as those used to define a software or computer program, stored in a computer-readable storage medium such as a memory device (e.g., a main memory 1004 and a static memory 1006 as described in FIG. 10, a Flash memory, random access memory (RAM), or any other type of volatile or non-volatile memory that stores instructions), or a storage device (e.g., a disk drive, or an optical drive). Alternatively or additionally, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

The database(s) 205 may include a variety of data that may be used by the system 200 while in operation. For example, the database(s) 205 may include inventory data including product availability for retail stores and distribution centers, internal transfer routes among stores and distribution centers, internal transfer schedules, product information (e.g., SKUs, manufacturer and model information, product model or product serial numbers, size, weight, description, etc.), and the like.

The geolocation detector 210 may detect the location of a user of a website. For example, the geolocation detector 210 may compare an internet protocol (IP) address of the user to a list of IP addresses and locations and may detect the location of the user based on the comparison. In another example, the website may include a profile feature for maintain a profile for the user and the geolocation detector 210 may detect the location of the user using the profile information. The geolocation detector 210 may output the location of the user for use by other components of the system 200. For example, the geolocation detector 210 may output a zip code for the user.

The input processor 215 may receive and process incoming data. For example, the input processor 215 may receive a search query from a website user interface. For example, a consumer may enter "washing machine" into a search query text field on a consumer website interface (e.g., consumer website interface 110 as described in FIG. 1) and submit the query. The input processor 215 may receive the search query text and may prepare (e.g., format, reorder, etc.) the search query text for use by the product selector 220. In some examples, the input processor 215 may receive inputs (e.g., button clicks, check box selections, link selections, etc.) from the website interface and may route corresponding commands to other components of the system 200.

The product selector 220 may select products from a list of available products based on a match (e.g., keyword, product name, item number, etc.) between the received search query text and products in the list. For example, a variety of washing machines included in the product list may be returned by the product selector in response to receiving a search query including the text "washing machine." in some examples, the product selector 220 may use the location output by the geolocation detector 210 to select products that are available for the location. For example, the list of products may include a list of locations to which the product is available and the product selector 220 may cross-reference the location to the list of locations when selecting products.

The product selector 220 may select products based on local availability (e.g., for pickup in a store near the user's location, etc.) and based on deliverability (e.g., for delivery to the user's location). For example, the product selector 220 may select washing machine A because the washing machine is available for pickup in a store in the user's zip code and may select washing machine B because the washing machine is available for delivery to the user's zip code.

The route mapper 225 may select a location for obtaining a product and may generate a route map for delivering the product to the user. In some examples, the route mapper 225 may identify a plurality of source locations for the product and a servicing location (e.g., location responsible for final delivery to the customer) for the user's location and may generate the route map to include routes between each of the source locations and the servicing location. For example, washing machine B may be available for delivery to the user's zip code and the route mapper 225 may generate a route map including possible source locations of the washing machine and a location responsible for final delivery of the washing machine.

The route mapper 225 may reference a list of internal transfer routes stored in the database(s) 205 in generating the route map. For example, there may be a truck that travels (e.g., on a scheduled basis) between a distribution center in Chicago (a source location) and a distribution center in Minneapolis and a truck that travels between the distribution center in Minneapolis and a store in Duluth (the servicing location) and the route mapper 225 may include this route in the route map. In some examples, the route mapper 225 may limit the route map based on the number of transfers that may be needed to move a product from a source location the servicing location. For example, the route mapper 225 may select source locations that are within two hops (e.g., two transfers) of the servicing location.

The transit time calculator 230 may calculate transit times for the product. The transit time calculator 230 may use the route map generated by the route mapper 225 and a list of internal transfer schedules and cutoff times to calculate a delivery date for the product to the user's location. For example, a truck may travel between source location A and the servicing location on Tuesday and Thursday with a cutoff time of 9 PM on the day of the transfer and the transit time calculator 230 may use the Thursday transfer when the search is run at 10 PM on Tuesday. In an example, the transit time calculator 230 may calculate the shortest transit time and may select the source location having the shortest transit time as the source location. For example, the route map may include routes between sources A, B, and C and the servicing location and the transit time calculator 230 may determine that the transit time between source A and the servicing location is five days, the transit time between source B and the servicing location is seven days, and the transit time between source C and the servicing location is two days and the transit time calculator may select source C as the source location.

The transit time calculator 230 may reference a delivery schedule for the servicing location to determine a delivery date. For example, the washing machine may be transferred from source C on Tuesday, July 7, arriving at the servicing location on Thursday, July 9, and the servicing location may make deliveries on Friday, July 10 and the delivery date may be output by the transit time calculator 230 as July 10. In some examples, the transit time calculator 230 may reference delivery capacity information for the servicing location in calculating the delivery date. For example, delivery slots for the servicing location may be full for July 10, but the servicing location may have delivery slots available for July 11 and the delivery date may be output as July 11. The transit time calculator 230 may calculate a local availability date for products available at the servicing location or a location near the user's location. In some examples, the transit time calculator may reference a location schedule in determining the local availability date. For example, the product may be available at a store in the user's zip code and the store may be open from 9 AM to 9 PM and the search may be occurring at 10 PM on July 7, and as a result the transit time calculator 230 may calculate the local availability date as July 8.

In some examples, the transit time calculator 230 may work in conjunction with the accompanying service scheduler 235 to determine availability of corresponding services such as product installation. For example, the servicing location may offer installation services and the product may be delivered and installed by an installation team. The accompanying service scheduler 235 may use the transit time calculated by the transit time calculator 230 to generate a schedule for accompanying services. For example, the transit time calculator 230 may have calculated that the washing machine will arrive at the servicing location on July 9 and the accompanying service scheduler 235 may generate an installation schedule beginning on July 9. The accompanying service scheduler 235 may calculate an accompanying service date using the schedule (e.g., the nearest date on or after July 9, etc.). The accompanying service scheduler 235 may output the calculated accompanying service date. For example, installation of the washing machine may be available on July 12, and the accompanying service date may be output as July 12.

The search result sorter/filterer 240 may sort and/or filter search results based on a variety of factors. For example, products that are unavailable for local pickup or delivery may be suppressed or may be placed at the bottom of the search results, products in the search results may be sorted based on local pickup dates and/or delivery dates, popularity, reviews, etc. The search result sorter/filterer 240 may work in conjunction with the output generator 245 to output search results for display on the website interface.

The output generator 245 may format output or otherwise prepare the Outputs generated by components of the system 200 for display on the website interface. The output generator 245 may present the products selected by the product selector 220 along with corresponding delivery dates and local availability dates calculated by the transit time calculator 230 and accompanying service dates calculated by the accompanying service scheduler 235. The output generator 245 may present each product with an interactive display element that may be used to add the product to an electronic shopping cart. For example, an ACME washing machine may be presented with an Add to Cart button. In some examples, the output generator 245 may replace the interactive display element with a message indicating the product is unavailable if the product does not have a corresponding local availability date or delivery date.

The user may select the interactive display element and may add a product from the search results to an electronic shopping cart. The input processor 215 may detect the selection of the item and may decrement an inventory count for the item from the source location indicated by the transit time calculator 230. If the product was selected for delivery, the delivery unit count for the servicing location may be decremented for the delivery date. If the product was selected for an accompanying service, a service schedule unit may be decremented for the servicing location for the accompanying service date. Thus, the product inventory, delivery, and accompanying service capacity for the product selected by the user is reserved while the product is in the user's electronic cart, preventing other users from taking the product inventory, delivery date slot, and/or accompanying service slot while the user finalizes the purchase.

FIG. 3 illustrates an example of a website interface 300 for large product pre-sourcing search engine, according to an embodiment. The website interface 300 may include sorting/filtering categories such as color 305A, features 305B, price 305C, delivery date 305D, and install date 305E and a location selection user interface element 310. The website interface 300 may include search results for a query for ACME brand washers that includes a listing of matching products along with corresponding delivery dates 315A, 315B, and 315C, local availability dates 320A, 320B, and 320C, installation dates 330A, 330B, and 330C, and add to cart buttons 325A, 325B, and 325C.

The website interface may be presented to a user of an electronic commerce website upon submitting a query on the electronic commerce website. The user's location may have been determined automatically (e.g., by the geolocation detector 210 as described in FIG. 2) or through user input received from the user inputting a location after selecting the location selection user interface element 310. For example, the user may have entered ACME brand washers into a search query textbox and clicked a submit icon, or the user may have selected a link to navigate to a page for ACME brand washers that automatically performs the search query based on matches of ACME brand washer search criteria. In response, products may have been selected (e.g., using the product selector 220 as described in FIG. 2) and local availability dates, delivery dates, and installation dates may be calculated (e.g., by the transit time calculator 230 and/or accompanying service scheduler 235 as described in FIG. 2). The selected products, local availability dates (e.g., 320A, 320B, and 320C), delivery dates (e.g., 315A, 315B, and 315C), installation dates (e.g., 330A, 330B, and 330C), sorting/filtering categories (e.g., 305A, 305B, 305C, 305D, and 305E), and the add to cart buttons (e.g., 325A, 325B, and 325C) may be generated for output on the website interface 300 (e.g., by the output generator 245 as described in FIG. 2).

Upon selecting one of the add to cart buttons, the user may be prompted to select whether the product will be picked up at a store, delivered, or installed. Upon receiving the selection, the product may be added to an electronic shopping cart, the inventory for the product may be decremented at a source location (e.g., local store for pickup, originating location for delivery), and a delivery and/or installation capacity unit may be decremented if the user has selected delivery or installation. If the user does not make finalize a purchase before expiration of a timeout value (e.g., electronic cart expiration, session expiration, etc.) or the user removes the item from the electronic shopping cart the inventory, delivery capacity, and/or installation capacity values may be incremented.

Providing the user with local availability dates, delivery dates, and installation dates in the search results avoids the number of clicks or transactions that a customer would perform to determine if a product is available and what fulfillment options (e.g., delivery, installation, etc.) are available. This may reduce customer frustration and may reduce calls to the web server hosting the website interface, resulting in reduced load and a reduced number of electronic transactions.

FIG. 4 illustrates an example of a website interface 400 for large product pre-sourcing search engine, according to an embodiment. The website interface 400 may include sorting/filtering categories such as color 405A, features 405B, price 405C, delivery date 405D, and install date 405E and a location selection user interface element 410. The website interface 400 may include search results for a query for ACME brand washers that includes a listing of matching products along with corresponding delivery dates 415A, 415B, and 415C, local availability dates 420A, 420B, and 420C, installation date 430, add to cart buttons 425A, and 425B, and unavailable message 435.

The website interface may be presented to a user of an electronic commerce website upon submitting a query on the electronic commerce website. The user's location may have been determined automatically (e.g., by the geolocation detector 210 as described in FIG. 2) or through user input received from the user inputting a location after selecting the location selection user interface element 410. For example, the user may have entered ACME brand washers into a search query textbox and clicked a submit icon, or the user may have selected a link to navigate to a page for ACME brand washers that automatically performs the search query based on matches of ACME brand washer search criteria. In response, products may have been selected (e.g., using the product selector 220 as described in FIG. 2) and local availability dates, delivery dates, and installation dates may be calculated (e.g., by the transit time calculator 230 and/or accompanying service scheduler 235 as described in FIG. 2). If it is determined that a product does not have local availability, the corresponding local availability date may be replaced with a message such as, for example, unavailable as shown in local availability date 420C. Similarly, if it is determined that a product does not have delivery availability, the delivery date may be replaced with a message such as, for example, unavailable as shown in delivery dates 415B and 415C. If it is determined that a product does not have installation availability, the installation date may not be generated for display. If it is determined that a product does not have local availability and does not have delivery availability, the add to cart button may be replaced with a message 435 indicating that the product in unavailable.

The selected products, local availability dates (e.g., 420A, 420B, and 420C), delivery dates (e.g., 415A, 415B, and 415C), installation date 430, sorting/filtering categories (e.g., 405A, 405B, 405C, 405D, and 405E), the add to cart buttons (e.g., 425A, and 425B), and message 435 may be generated for output on the website interface 400 (e.g., by the output generator 245 as described in FIG. 2).

Upon selecting one of the add to cart buttons, the user may be prompted to select whether the product will be picked up at a store, delivered, or installed. Upon receiving the selection, the product may be added to an electronic shopping cart, the inventory for the product may be decremented at a source location (e.g., local store for pickup, originating location for delivery), and a delivery and/or installation capacity unit may be decremented if the user has selected delivery or installation. If the user does not make finalize a purchase before expiration of a timeout value (e.g., electronic cart expiration, session expiration, etc.) or the user removes the item from the electronic shopping cart the inventory, delivery capacity, and/or installation capacity values may be incremented.

Providing the user with local availability dates, delivery dates, and installation dates in the search results avoids the number of clicks a customer may experience to determine if a product is available and what fulfillment options (e.g., delivery, installation, etc.) are available. This may reduce customer frustration and may reduce calls to the webserver hosting the website interface resulting in reduced load.

Figure 5:
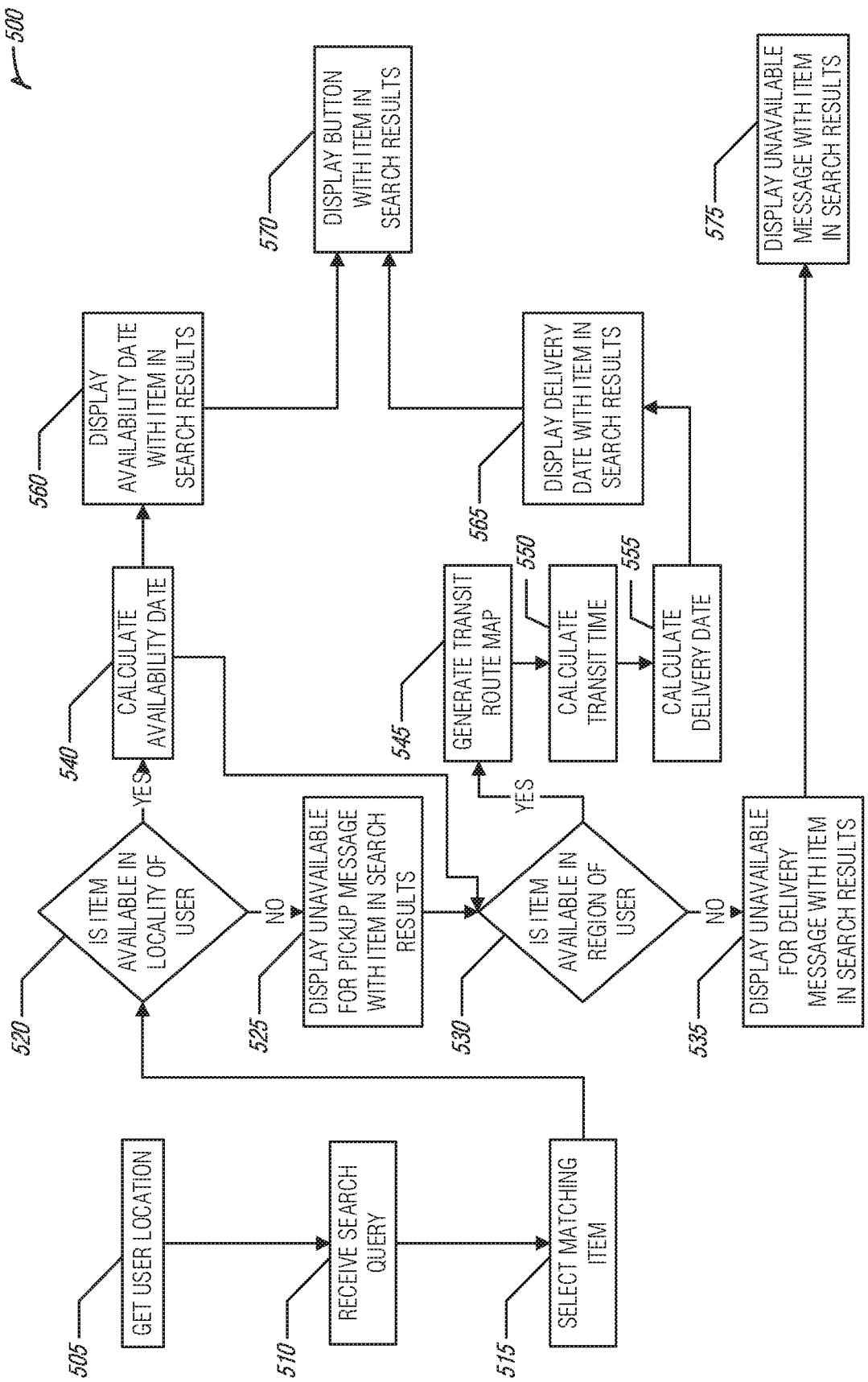
FIG. 5 illustrates an example of a process for generating website interface outputs for a large product pre-sourcing search engine, according to an embodiment.

FIG. 5 illustrates an example of a process 500 for generating website interface outputs for a large product pre-sourcing search engine, according to an embodiment. The process 500 may be used by the large product pre-sourcing search engine to select products and provide corresponding availability dates.

At operation 505, the user's location may be determined (e.g., by the geolocation detector 210 as described in FIG. 2). For example, information from a profile of the user, the user's IP address, input received, etc. may be used to determine the location of the user.

At operation 510, a search query may be received (e.g., by the input processor 215 as described in FIG. 2). For example, the user may submit a query for ACME brand washing machines (e.g., as described in FIGS. 3 and 4) which may be received for processing.

At operation 515, a matching item (e.g., product, etc.) may be selected based on the received search query (e.g., by the product selector 220 as described in FIG. 2). For example, an ACME washing machine may be selected for inclusion in the search results.

At decision 520, it may be determined if the item is available in the locality (e.g., location) of the user (e.g., by the route mapper 225 as described in FIG. 2). For example, it may be determined whether the ACME washing machine is available for pickup at a store near the zip code of the user. If the product is determined to be unavailable, the process continues at operation 525 and a message indicating that the item is unavailable for local pickup may be displayed in the search results (e.g., by the output generator 245 as described in FIG. 2). The process then continues to decision 530.

If the item is available locally, the process continues to operation 540 and an availability date may be calculated for the item (e.g., by the transit time calculator 230 as described in FIG. 2). For example, the ACME washing machine may be in-stock at a store in the user's zip code for pickup today. In another example, the ACME washing machine may be transferable to the local store from a local distribution center for pickup on the next business day. The process then continues to decision 530 and operation 560. At operation 560, the calculated availability date may be displayed with the search results. For example, the ACME washing machine calculated with a pickup date of today may be displayed with an availability date of today. The process continues at operation 570.

At decision 530 it may be determined if the item is available in a region of the user (e.g., by the route mapper 225 as described in FIG. 2). For example, it may be determined whether the ACME washing machine may be delivered to a servicing location (e.g., location responsible for final delivery of the item to the user) via an internal transit network (e.g., using pre-schedule shipping routes). If it is determined that the item is unavailable in the region of the user processing continues to operation 535. At operation 535, a message indicating that the item is unavailable for delivery may be displayed in the search results (e.g., by the output generator 245 as described in FIG. 2). Having determined that the product is unavailable for local pickup or for delivery the process continues to operation 575 and a message may be displayed with the search results indicating the item is unavailable. In an example, the message may replace an add to cart button displayed in the search results.

If it is determined that the item is available for delivery, the process continues to operation 545 and a transit route map may be generated (e.g., by the route mapper 225 as described in FIG. 2). For example, the route between a source location having the ACME washing machine and the servicing location may be generated including transfers between intermediate locations. At operation 550, a transit time may be calculated (e.g., by the transit time calculator 230 as described in FIG. 2). For example, the time taken for the item to traverse the route map using the pre-scheduled internal transit network may be tallied to determine the transit time to between the source location and the servicing location. At operation 555 a delivery date may be calculated (e.g., by the transit time calculator 230 as described in FIG. 2). For example, the transit time may be combined with the local delivery schedule of the servicing location to calculate the delivery date. At operation 565, the calculated delivery date may be displayed with the item in the search results (e.g., by the output generator 245 as described in FIG. 2).

At operation 570, having determined that the item is either and/or both available locally and available for delivery a button may be displayed with the item in the search results (e.g., by the output generator 245 as described in FIG. 2). For example, the ACME washing machine may be displayed with an add to cart button allowing the user to add the ACME washing machine to an electronic shopping cart.

Although the preceding examples of FIGS. 3-5 provide an example use case involve a website and website user interface (e.g., presented in a web browser), it will be understood that like user interfaces may be provided in other forms of software applications. For instance, a software app that executes on a mobile device (e.g., tablet, smartphone) may communication an application interface to obtain and output data and provide electronic commerce functionality. In a similar fashion, other forms of electronic shopping carts and shopping scenarios may be employed, including in shopping scenarios that differ from typical website checkout interfaces.

In a further example, in addition to the search results discussed above, additional logic may be used to output, sort, or filter special search results based on considerations such as a user profile (e.g., a preferred customer), geographic area, or the like. In still a further example, logic may be used to offer and present special shipping incentives (e.g., fast shipping, free delivery, additional scheduling slots) based on user profile, geographic area, or the like.

Figure 6:
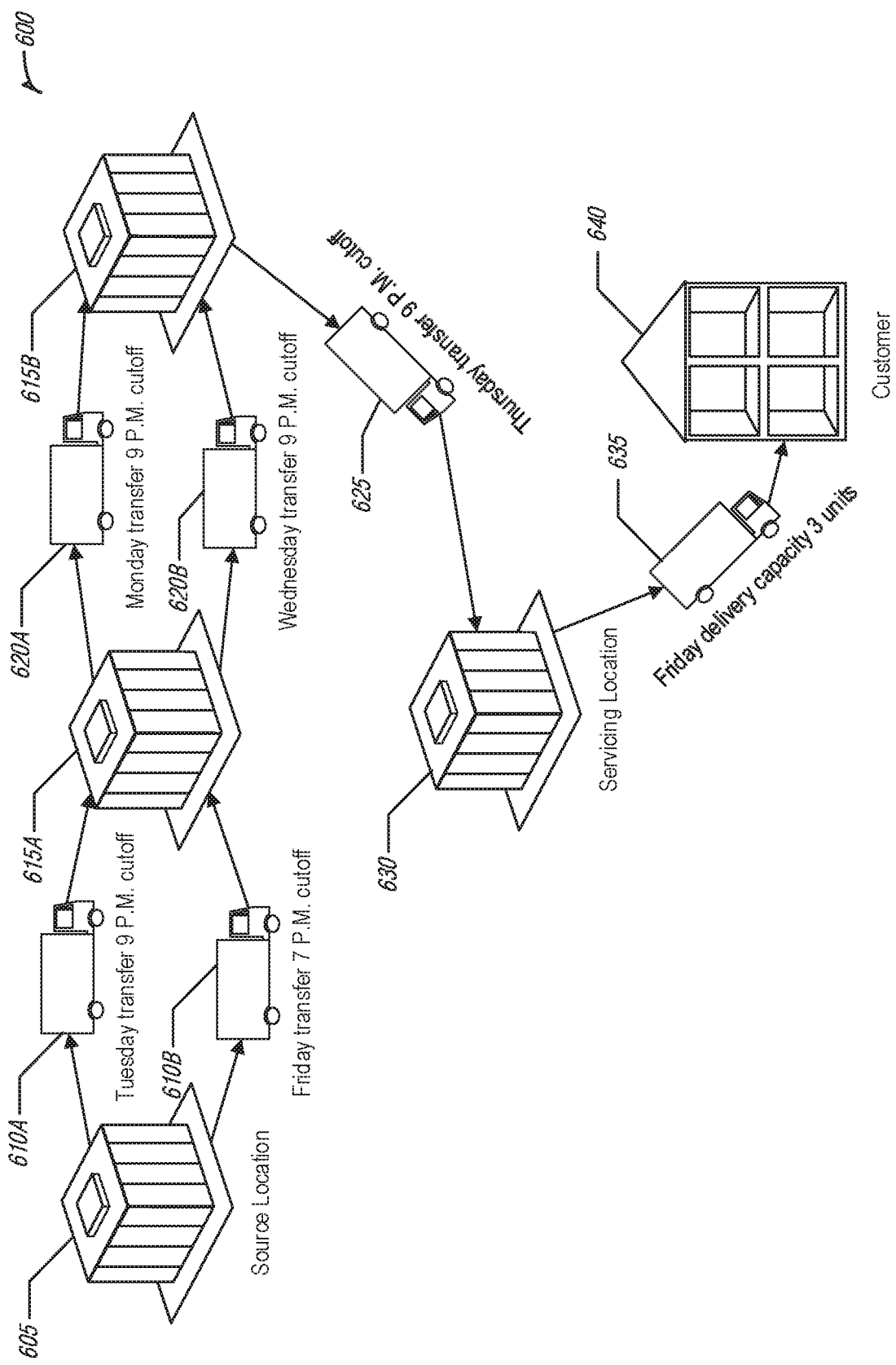
FIG. 6 illustrates an example of a diagram of route map generation and transit time scheduling for a large product pre-sourcing search engine, according to an embodiment.

FIG. 6 illustrates an example of a diagram 600 of route map generation and transit time scheduling for a large product pre-sourcing search engine, according to an embodiment. The diagram 600 may include a source location 605, pre-scheduled transfers from the source location 610A and 610B, a first intermediate location 615A, pre-scheduled transfers from the first intermediate location 620A and 620B, a second intermediate location 615B, pre-scheduled transfers from the second intermediate location 625, a servicing location 630, a local delivery 635 from the servicing location, and a customer 640.

The customer may be using a search engine of a website interface of an electronic commerce site to shop for an item such as a washing machine. The user may have entered ACME brand washing machines into a search field of the website interface and submitted the query. Upon receiving the search query, the search engine may begin identifying matching products (e.g., using the product selector 210 as described in FIG. 2). Once a product is selected, the source location 605 may be identified as a location holding inventory that may be used to fulfill the order. For example, a distribution center in Denver may have an ACME washing machine in-stock and may be selected as the source location. The servicing location 630 may be identified as a location responsible for final delivery of products to a zip code of the customer 640.

A route map may be generated between the source location 605 and the servicing location 630 (e.g., by the route mapper 225 as described in FIG. 2) for a product selected for inclusion in the search results. The route map may be generated based on pre-scheduled transfers between locations. For example, the source location 605 may have pre-scheduled transfers 610A and 610B going to the first intermediate location 615A, the first intermediate location 615A may have pre-scheduled transfers 620A and 620B going to the second intermediate location, and the second intermediate location may have pre-scheduled transfer 625 going to the servicing location 630. The route map may be comprised of a combination of the pre-scheduled transfers that together move the item from the source location 605 to the servicing location 630.

A transit time may be calculated for the product using the route map (e.g., by the transit time calculator 230 as described in FIG. 2). The transit time calculator may take into consideration cutoff times for the pre-scheduled transfers. For example, if the search is conducted before 9 P.M. on Tuesday, the transit time may be calculated for the product as two days because the product may be transferred Tuesday (e.g., the same day) using pre-scheduled transfer 610A to the first intermediate location 615A, Wednesday (e.g., the next day) using pre-scheduled transfer 620B to the second intermediate location 615B, and Thursday (e.g. the second day) using pre-scheduled transfer 625 to the servicing location 630. The transit time calculation may combine the transit time between the source location and the servicing location with a local delivery schedule for the servicing location 630. For example, the servicing location 630 may have three remaining delivery slots available on the local delivery 635 on Friday (e.g., the third day) and the delivery date may be calculated as Friday based on the servicing location 630 having delivery capacity for the day after the product arrives at the servicing location 630.

The delivery date calculated using the pre-scheduled transfers and corresponding cutoff times and the local delivery schedule of the servicing location 630 may be displayed in the search results returned to the customer 640 in the website interface (e.g., by the output generator 245 as described in FIG. 2).

Figure 7:
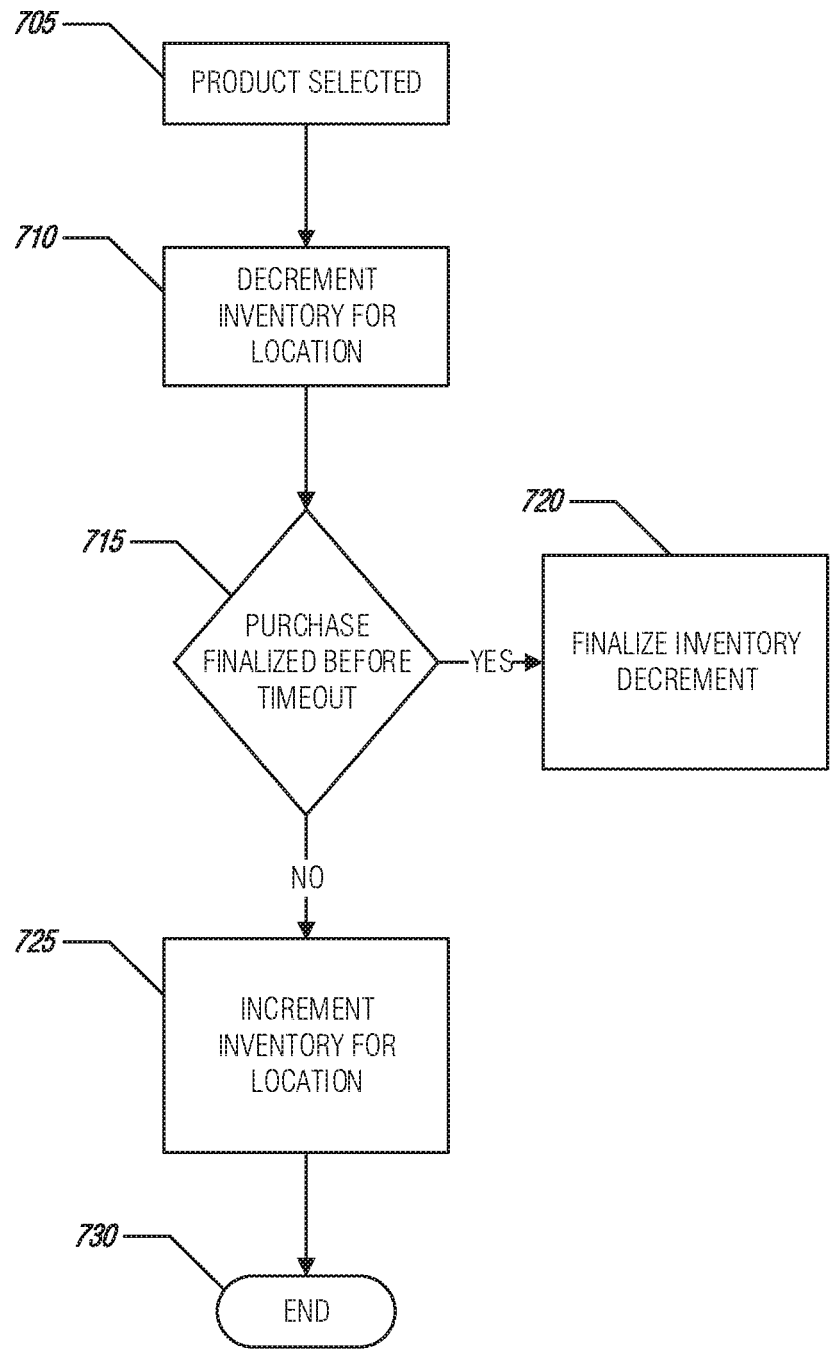
FIG. 7 illustrates an example of a process for pre-sourcing inventory for a product in a large product pre-sourcing search engine, according to an embodiment.

FIG. 7 illustrates an example of a process 700 for pre-sourcing inventory for a product for a large product pre-sourcing search engine, according to an embodiment. The process 700 may be used by the large product pre-sourcing search engine to reserve products while a customer is finalizing a purchase.

At operation 705, a product may be selected. For example, the customer may click an add to cart button to add the product to an electronic shopping cart. For example, the customer may have submitted a search query for ACME brand washing machines and the search results may include a model 1000 ACME brand washing machine along with a local availability date, a delivery date, and an installation date, and the add to cart button and the customer may have clicked the add to cart button and selected to pickup the product at a local store near the customer's zip code.

At operation 710, the inventory of the product may be decremented for the location having the product in stock. For example, the store near the customer's zip code may have ten model 1000 ACME washing machine in stock and the quantity available may be decremented to nine.

At decision 715, it may be determined whether the customer finalized the purchase before timeout (e.g., session timeout, electronic shopping cart expiration, a pre-set timeout value, etc.). For example, the customer may have added the model 1000 ACME washing machine to the cart, but may not have finalized the purchase. If it is determined that the customer has finalized the purchase (e.g., completed a checkout process, etc.) the decrement to the inventory for the location near the customer's zip code may be finalized at operation 720. If it is determined that the customer has not finalized the purchase by the timeout the process continues at operation 725.

At operation 725, the inventory is incremented for the location. For example, the customer may not have finalized a purchase of the model 1000 ACME washing machine before the electronic shopping cart expired and the available quantity of the model 1000 ACME washing machine, decremented to nine at operation 710, may be incremented to ten. At operation 730, the process ends.

Figure 8:
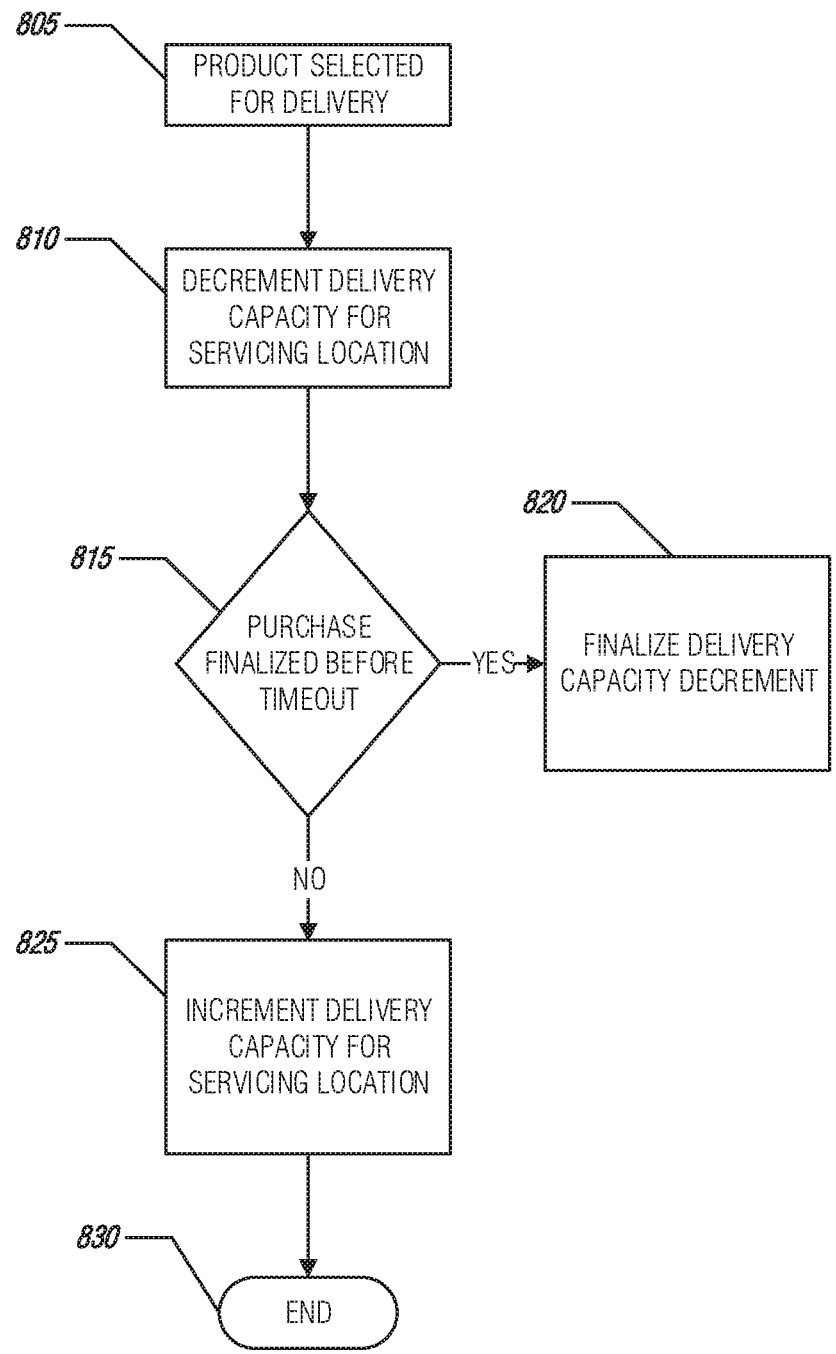
FIG. 8 illustrates an example of a process for pre-sourcing delivery for a product in a large product pre-sourcing search engine, according to an embodiment.

FIG. 8 illustrates an example of a process 800 for pre-sourcing delivery for a product for a large product pre-sourcing search engine, according to an embodiment. The process 800 may be used by the large product pre-sourcing search engine to reserve delivery capacity while a customer is finalizing a purchase.

At operation 805, a product may be selected for delivery. For example, the customer may click an add to cart button to add the product to an electronic shopping cart. For example, the customer may have submitted a search query for ACME brand washing machines and the search results may include a model 1000 ACME brand washing machine along with a local availability date, a delivery date, and an installation date, and the add to cart button and the customer may have clicked the add to cart button and selected to have the product delivered to the customer's location.

At operation 810, a delivery capacity may be decremented for a location servicing the customer's location (e.g., a location to which the product may be transferred for final delivery). For example, a distribution center servicing the customer's zip code may have ten delivery slots available on the day after the model 1000 ACME washing machine is expected to be transferred to the servicing location at the delivery slots for that day may be decremented to nine.

At decision 815, it may be determined whether the customer finalized the purchase before timeout (e.g., session timeout, electronic shopping cart expiration, a pre-set timeout value, etc.). For example, the customer may have added the model 1000 ACME washing machine to the cart, but may not have finalized the purchase. If it is determined that the customer has finalized the purchase (e.g., completed a checkout process, etc.) the decrement to the delivery capacity for the servicing location may be finalized at operation 820. If it is determined that the customer has not finalized the purchase by the timeout the process continues at operation 825.

At operation 825, the delivery capacity may be incremented for the delivery day at the servicing location. For example, the customer may not have finalized a purchase of the model 1000 ACME washing machine before the electronic shopping cart expired and the delivery slots for the day the model 1000 ACME washing machine was to be delivered, decremented to nine at operation 810, may be incremented to ten. At operation 830, the process ends.

Figure 9:
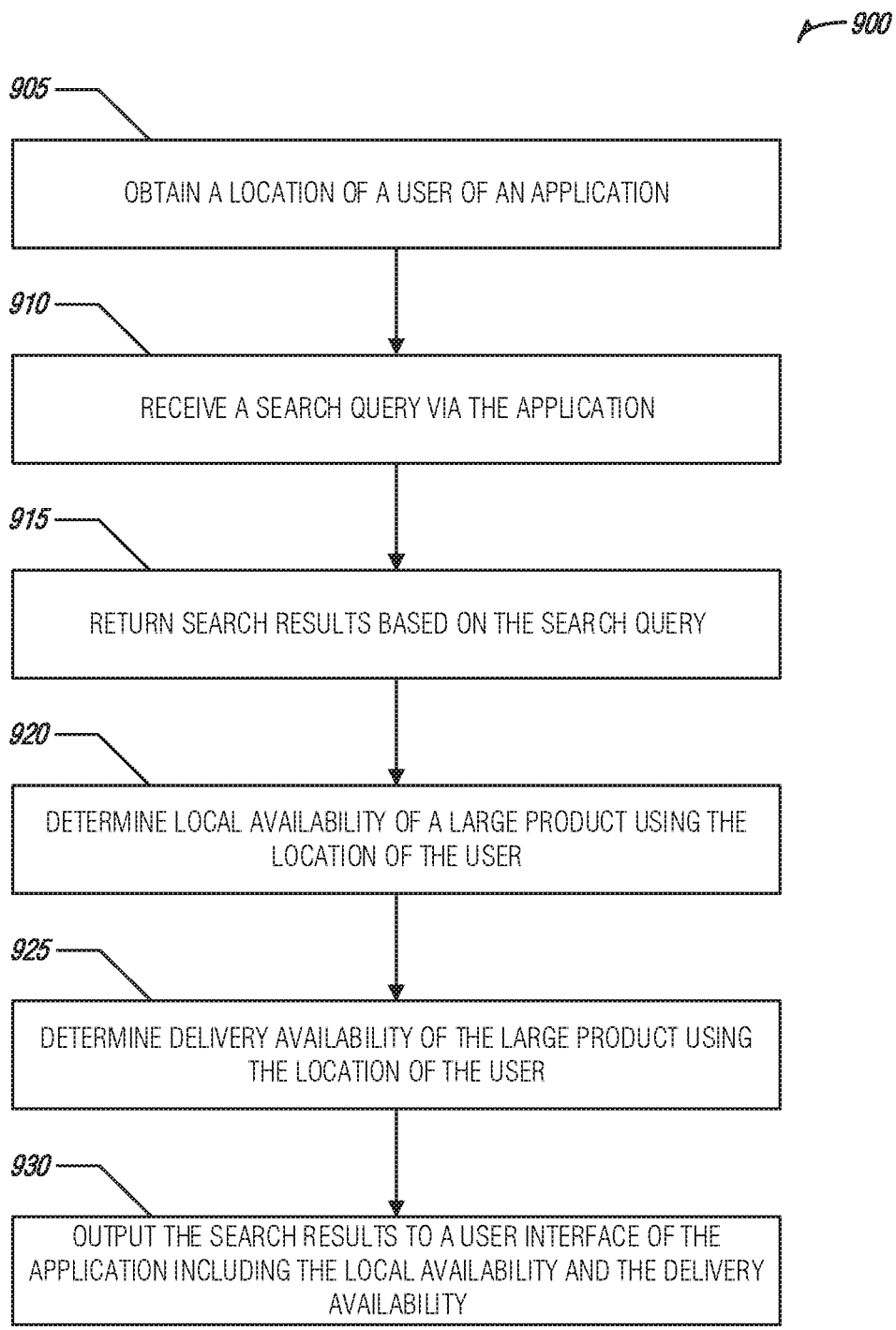
FIG. 9 is a flow diagram of an example method for a large product pre-sourcing search engine, according to an embodiment.

FIG. 9 is a flow diagram of an example method 900 for a large product pre-sourcing search engine, according to an embodiment. The method 900 may be used to implement the features described in FIGS. 1-8.

At operation 905, a location of the user of an application (e.g., a website, a software app, etc.) may be obtained (e.g., by the geolocation detector 210 as described in FIG. 2). In an example, the location of the user may be obtained using an Internet protocol address of the user. In another example, the location of the user may be obtained using an application profile (e.g., website profile, user profile, etc.) of the user. In another example, the location of the user may be obtained using input received via the application.

At operation 910, a search query may be received via the application (e.g., using the input processor 215 as described in FIG. 2). In an example, the search query may be received from a textbox included with the application.

At operation 915, search query results may be returned based on the search query (e.g., by the product selector 220 as described in FIG. 2). The search results may include a product with special handling constraints.

At operation 920, a local availability of the product with special handling constraints may be determined using the location of the user (e.g., using the route mapper 225 as described in FIG. 2). In an example, an inventory location nearest the location of the user may be identified, a cutoff time may be determined for the inventory location, a local availability date may be calculated for the inventory location using the cutoff time, and the local availability may include the local availability date.

At operation 925, a delivery availability of the product with special handling constraints may be determined using the location of the user. In an example, a servicing location may be identified corresponding to the location of the user, an inventory location may be determined using the servicing location, a transit route list may be generated between the inventory location and the servicing location using a set of predefined internal transit routes, a delivery date may be calculated using the generated transit route list and a set of transit schedules corresponding to the predefined internal transit routes, and the delivery availability may include the delivery date. In some examples, a location type may be identified for the servicing location corresponding to the location of the user, a service type may be determined for the product with special handling constraints, and the delivery date may be calculated using the location type and the service type.

At operation 930, the search results may be output including the local availability and the delivery availability. In some examples, the product with special handling constraints may be identified as unavailable using the local availability and the delivery availability and an indication that the product with special handling constraints is unavailable may be output with the search results. In some examples, a selection of the product with special handling constraints from the search results may be received, and an available quantity may be decremented for the product with special handling constraints based on the selection. In an example, the available quantity may correspond to an inventory location nearest the location of the user. In another example, the available quantity may correspond to an inventory location corresponding to a servicing location corresponding to the location of the user.

In a further example, the preceding techniques for evaluating and estimating features of dates or schedules for delivery and services may be provided in connection with a cached data representation. For example, aspects of delivery and service scheduling, such as the "Get It By" dates that are output in a user interface, may be provided with use of cached data that provides an intermediate estimation for a particular customer, geographic area, product type, or service type. Other features of date or schedule estimation may be implemented in the preceding examples through the use of caching.

Although many of the preceding examples were provided with reference to in-stock items (e.g., products fulfilled from inventory or stock of a distribution center or a retailer store), it will be understood that similar logic and processing may be used to process logic for pre-sourced items. This may include logic and processing to provide delivery estimation and delivery information for special order, custom, or manufactured products, including products that are not yet assembled or packaged, or even in-transit products from a manufacturer, distributor, and the like.

Figure 10:
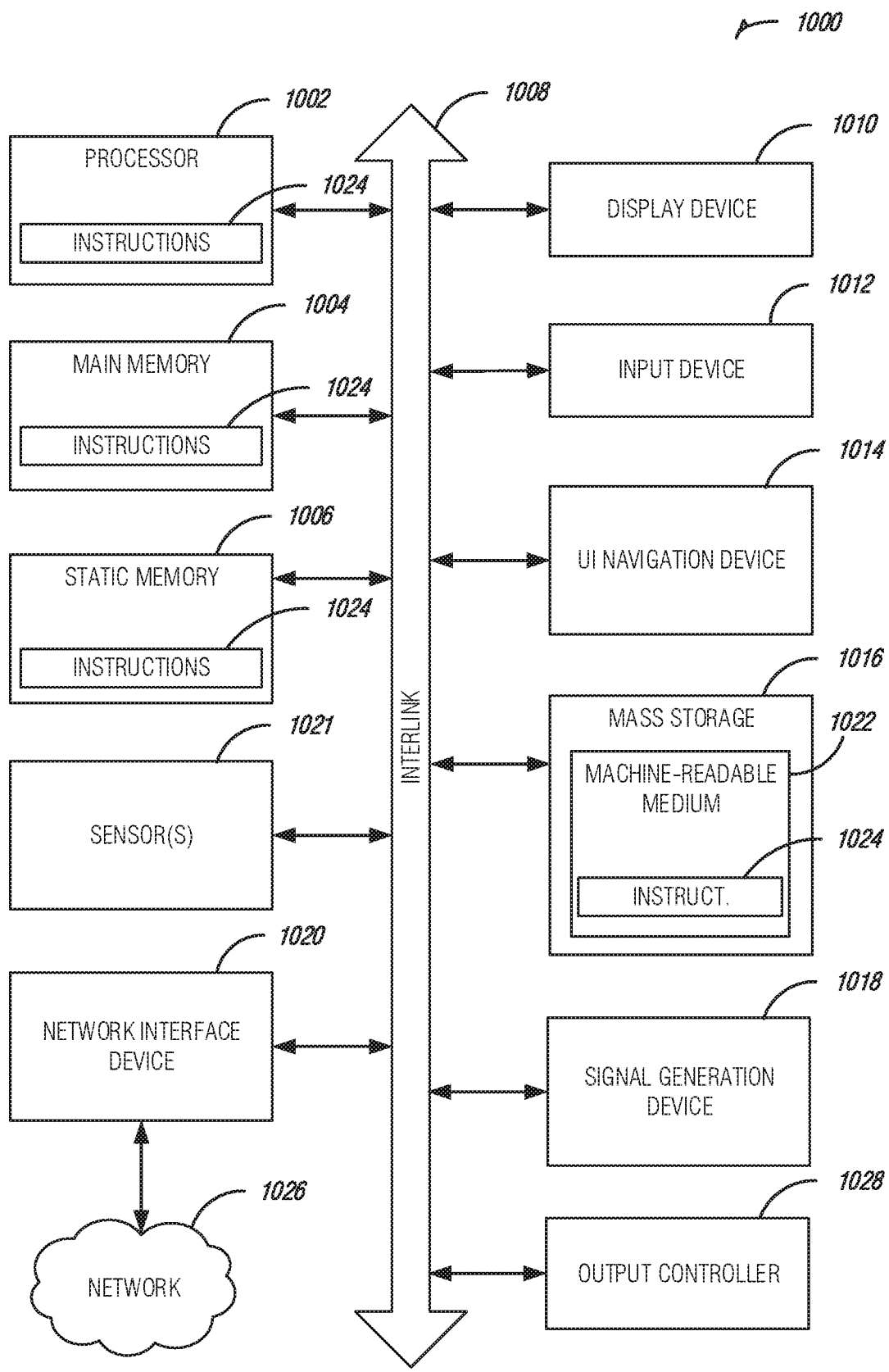
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1.000 may include a hardware processor 1002 (e.g., a central processing unit (CPU), a graphics processing unit (GPU), hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 10:24 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with each other. Other embodiments may be used, such as by one of ordinary skill in the art upon reviewing the above description. Further, the following claims are hereby incorporated into the Detailed Description, with each claim standing on its own as a separate embodiment.

What is claimed is:

1. A system for a large product pre-sourcing search engine, the system comprising:
   at least one processor; and
   a memory including instructions that, when executed by the at least one processor, cause the at least one processor to perform operations to:
   obtain, via an application, a location of a user of the application;
   receive, via the application, a search query for one or more products with special handling constraints;
   match the search query to one or more items with special handling constraints offered for sale;
   determine local availability for each of the matched one or more items with special handling constraints using the location of the user, wherein the local availability is determined from inventory at a pickup location in proximity to the location of the user;
   determine delivery availability for each of the matched one or more items with special handling constraints using the location of the user, wherein the delivery availability is determined from an evaluation of a transit routing list, the transit routing list indicating an availability of inventory between respective inventory locations and a servicing location providing final delivery to the user, and the transit routing list produced from an estimated transfer of the product among predefined internal transit routes using transit schedules corresponding to the predefined internal transit routes;
   for each of the matched one or more items with special handing constraints, identify a local inventory item corresponding to the item with special handing constraints based on the pickup location and a delivery inventory item corresponding to the item with special handing constraints from the inventory based on the determined delivery availability;
   return search results based on the matched search query, wherein the search results for each of the matched one or more items with special handling constraints indicates the matched item, the pickup location for the local inventory item, a local availability date for the local inventory item, and a delivery date for the delivery inventory item based on a time period taken for the delivery inventory item to traverse the predefined internal transit routes based on the corresponding transit schedules;
   generate content for display in an application user interface of the applications, wherein the generated content includes a formatted display of the returned search results for output in an interactive display element; and cause display of the content, via the application user interface of the application, wherein the displayed application user interface provides the formatted display of the returned search results, wherein the display of the content for each of the matched one or more items with special handling constraints within the search results is updated based on an indication of unavailability of the local inventory item or the delivery inventory item, and wherein the update reformats the content to indicate unavailability of the local inventory item, unavailability of the delivery inventory item, or availability of a replacement inventory item for the local inventory item or the delivery inventory item.

2. The system of claim 1, wherein the operations to determine local availability of the product with special handling constraints further comprises operations to:

identify an inventory location nearest the location of the user;

determine a cutoff time for the inventory location; and calculate a local availability date for the inventory location using the cutoff time, wherein the local availability includes the local availability date.

3. The system of claim 1, wherein the operations to determine the delivery availability of the product with special handling constraints further comprises operations to:

identify the servicing location to provide the final delivery with an accompanying service corresponding to the location of the user;

determine an inventory location using the servicing location; and calculate a delivery date using the transit routing list and the transit schedules corresponding to the predefined internal transit routes, wherein the delivery availability includes the delivery date.

4. The system of claim 3, further comprising operations to:

identify the servicing location using prioritization rules that optimize the predefined internal transit routes to prioritize sourcing of the product from among: a warehouse, a store, or a third party location; and identify the accompanying service required for the product, wherein calculating the delivery date produces an estimate of the delivery date based on the identified service location and the identified accompanying service.

5. The system of claim 1, further comprising operations to:

identify that the product with special handling constraints is unavailable using the local availability and the delivery availability; and output, with the search results, an indication that the product with special handling constraints is unavailable.

6. The system of claim 1, further comprising operations to:

receive selection of the product with special handling constraints from the search results; and decrement an available quantity for the product with special handling constraints based on the selection.

7. The system of claim 6, wherein the available quantity corresponds to an inventory location nearest the location of the user.

8. The system of claim 6, wherein the available quantity corresponds to an inventory at the servicing location.

9. At least one non-transitory computer readable medium including instructions for a large product pre-sourcing search engine that, when executed by a machine, cause the machine to perform operations to:

obtain, via an application, a location of a user of the application;

receive, via an application, a search query for one or more products with special handling constraints;

match the search query to one or more items with special handling constraints offered for sale;

determine local availability for each of the matched one or more items with special handling constraints using the location of the user, wherein the local availability is determined from inventory at a pickup location in proximity to the location of the user;

determine delivery availability for each of the matched one or more items with special handling constraints using the location of the user, wherein the delivery availability is determined from an evaluation of a transit routing list, the transit routing list indicating an availability of inventory between respective inventory locations and a servicing location providing final delivery to the user, and the transit routing list produced from an estimated transfer of the product among predefined internal transit routes and transit schedules corresponding to the predefined internal transit routes;

for each of the matched one or more items with special handing constraints, identify a local inventory item corresponding to the item with special handing constraints based on the pickup location and a delivery inventory item corresponding to the item with special handing constraints from the inventory based on the determined delivery availability;

return search results based on the matched search query, wherein the search results for each of the matched one or more items with special handling constraints indicates the matched item, the pickup location for the local inventory item, a local availability date for the local inventory item, and a delivery date for the delivery inventory item based on a time period taken for the delivery inventory item to traverse the predefined internal transit routes based on the corresponding transit schedules;

generate content for display in an application user interface of the applications, wherein the generated content includes a formatted display of the returned search results for output in an interactive display element; and cause display of the content, via the application user interface of the application, wherein the displayed application user interface provides the formatted display of the returned search results, wherein the display of the content for each of the matched one or more items with special handling constraints within the search results is updated based on an indication of unavailability of the local inventory item or the delivery inventory item, and wherein the update reformats the content to indicate unavailability of the local inventory item, unavailability of the delivery inventory item, or availability of a replacement inventory item for the local inventory item or the delivery inventory item.

10. The at least one computer readable medium of claim 9, wherein the operations to determine local availability of the product with special handling constraints further comprises operations to:

identify an inventory location nearest the location of the user;

determine a cutoff time for the inventory location; and calculate a local availability date for the inventory location using the cutoff time, wherein the local availability includes the local availability date.

11. The at least one computer readable medium of claim 9, wherein the operations to determine the delivery availability of the product with special handling constraints further comprises operations to:
identify the servicing location to provide the final delivery with an accompanying service corresponding to the location of the user;
determine an inventory location using the servicing location; and
calculate a delivery date using the transit routing list and the transit schedules corresponding to the predefined internal transit routes, wherein the delivery availability includes the delivery date.

12. The at least one computer readable medium of claim 9, further comprising operations to:
identify that the product with special handling constraints is unavailable using the local availability and the delivery availability; and
output, with the search results, an indication that the product with special handling constraints is unavailable.

13. The at least one computer readable medium of claim 9, further comprising operations to:
receive selection of the product with special handling constraints from the search results; and
decrement an available quantity for the product with special handling constraints based on the selection.

14. A method for a large product pre-sourcing search engine, the method comprising a plurality of electronic operations executed with a processor and memory of a computing device, the plurality of electronic operations including:
obtaining, via an application, a location of a user of the application;
receiving, via the application, a search query for one or more products with special handling constraints;
matching the search query to one or more items with special handling constraints offered for sale;
determining local availability for each of the matched one or more items with special handling constraints using the location of the user, wherein the local availability is determined from inventory at a pickup location in proximity to the location of the user;
determining delivery availability for each of the matched one or more items with special handling constraints using the location of the user, wherein the delivery availability is determined from an evaluation of a transit routing list, the transit routing list indicating an availability of inventory between respective inventory locations and a servicing location providing final delivery to the user, and the transit routing list produced from an estimated transfer of the product among predefined internal transit routes and transit schedules corresponding to the predefined internal transit routes;
for each of the matched one or more items with special handing constraints, identifying a local inventory item corresponding to the item with special handing constraints based on the pickup location and a delivery inventory item corresponding to the item with special handing constraints from the inventory based on the determined delivery availability;
returning search results based on the matched search query, wherein the search results for each of the matched one or more items with special handling constraints indicates the matched item, the pickup location for the local inventory item, a local availability date for the local inventory item, and a delivery date for the delivery inventory item based on a time period taken for the delivery inventory item to traverse the predefined internal transit routes based on the corresponding transit schedules;
generating content for display in an application user interface of the applications, wherein the generated content includes a formatted display of the returned search results for output in an interactive display element; and
causing display of the content, via the application user interface of the application, wherein the displayed application user interface provides the formatted display of the returned search results, wherein the display of the content for each of the matched one or more items with special handling constraints within the search results is updated based on an indication of unavailability of the local inventory item or the delivery inventory item, and wherein the update reformats the content to indicate unavailability of the local inventory item, unavailability of the delivery inventory item, or availability of a replacement inventory item for the local inventory item or the delivery inventory item.

15. The method of claim 14, wherein determining local availability of the product with special handling constraints further comprises:
identifying an inventory location nearest the location of the user;
determining a cutoff time for the inventory location; and
calculating a local availability date for the inventory location using the cutoff time, wherein the local availability includes the local availability date.

16. The method of claim 14, wherein determining the delivery availability of the product with special handling constraints further comprises:
identifying the servicing location to provide the final delivery with an accompanying service corresponding to the location of the user;
determining an inventory location using the servicing location; and
calculating a delivery date using the transit routing list and the transit schedules corresponding to the predefined internal transit routes, wherein the delivery availability includes the delivery date.

17. The method of claim 16, the electronic operations further including:
identifying the servicing location using prioritization rules that optimize the predefined internal transit routes to prioritize sourcing of the product from among: a warehouse, a store, or a third party location; and
identifying an accompanying service required for the product, wherein calculating the delivery date produces an estimate of the delivery date based on the identified service location and the identified accompanying service.

18. The method of claim 14, the electronic operations further including:
identifying that the product with special handling constraints is unavailable using the local availability and the delivery availability; and
outputting, with the search results, an indication that the product with special handling constraints is unavailable.

19. The method of claim 14, the electronic operations further including:

receiving selection of the product with special handling constraints from the search results; and decrementing an available quantity for the product with special handling constraints based on the selection.

20. The method of claim 19, wherein the available quantity corresponds to an inventory location nearest the location of the user.

21. The method of claim 19, wherein the available quantity corresponds to an inventory at the servicing location.

* * * * *